United States Patent Office 3,357,800
Patented Dec. 12, 1967

3,357,800
PURIFICATION OF MAGNESIUM CHLORIDE
WITH ALCOHOL
Remigius A. Gaska, Midland, Mich., assignor to The Dow
Chemical Company, Midland, Mich., a corporation of
Delaware
No Drawing. Filed Nov. 26, 1963, Ser. No. 326,220
7 Claims. (Cl. 23—297)

This invention relates to the separation and recovery of magnesium chloride from solid mixtures of magnesium chloride and alkali metal halides and more particularly, relates to a novel process for recovering the hydrates of said chloride in a highly purified form.

Magnesium chloride is ordinarily recovered from aqueous solutions containing magnesium chloride and primarily other dissolved alkali metal and alkaline earth salts such as, for example, sodium, potassium and calcium chlorides, by precipitation of the double salt, carnallite. This method, however, has the disadvantage that it produces a magnesium chloride product having a high impurity level with respect primarily to both sodium and potassium chloride. Because of this impurity level, use of this material, such as, for example, in electrolysis to magnesium metal, therefore, is limited. In part at least, a portion of said impurities derive from the fact that in the carnallite process, an aqueous phase is required from which the magnesium chloride product is obtained which tends to promote impurity occlusion in the product. It would be desirable, therefore, to have a process for producing a magnesium chloride product direct from solid mixtures containing magnesium chloride and having a higher purity than that obtained in the carnallite process.

An object of the present invention, therefore, is to provide a simple, efficient, and economical process for separating and recovering magnesium chloride hydrates in a high state of purity directly from solid mixtures containing essentially magnesium chloride and a lesser amount in total of other alkali metal and alkaline earth salts.

Other objects and advantages of the invention will become apparent from the following detailed description thereof.

In general, then, the process of the present invention comprises admixing, for example, by leaching, a solid acidified salt mixture containing the hydrate of magnesium chloride, including other alkali metal and alkaline earth salts as impurities from which the magnesium chloride is desired to be separated, particularly from potassium and sodium chloride, with a quantity of ethanol or methanol, preferably methanol, as a solvent in a particular weight ratio of solvent-to-mixture depending on the temperature, the hydrate sought, and solvent used. Upon so mixing, essentially all of the magnesium chloride in said mixture concentrates in the non-aqueous organic phase, thereby separating the magnesium chloride from the other mixture components. Thereafter, the liquid organic phase containing the dissolved magnesium chloride is separated, as by filtration or centrifuging, for example, from the residual solids. So separated, the magnesium chloride can now be recovered from the organic phase, by ordinary evaporation or vaporization of said phase by known techniques such as, for instance, spray drying, to thereby leave a high yield solid product of high purity magnesium chloride hydrate.

In general, the material (solid mixture) from which the high purity magnesium is to be recovered should be admixed with a sufficient amount of methanol or ethanol solvent to dissolve essentially all said magnesium chloride therein. Normally, however, a particular solvent-to-solid weight ratio, such as, for example, in recovering the dihydrate of magnesium chloride at 25° C., within the range of from about 1.8 to about 2.4, may be employed. In addition, the methanol-to-water weight ratio should not exceed about 8.75. Other solvent-to-solid weight ratios together with other solvent-to-water ratios, depending on the temperature, the hydrate to be recovered, and the solvent employed may also be used as determined by one skilled in the art.

Separation and recovery of magnesium chloride by the present invention is accomplished, preferably with active stirring or agitation, at an apparent pH of about 5 or below, thereby avoiding formation of solid alcoholates, and at a temperature within the range of from about 0° to about 50° C., preferably between 20° and 35° C. Though higher temperatures may be employed in separating magnesium chloride, to do so is inefficient inasmuch as it necessitates the use of pressure equipment. Conveniently, the present process may readily be carried out at the normal ambient temperature and pressure. The required pH may be established by the addition of an acid, such as, for example HCl, in an amount sufficient therefor.

By means of the present invention, then magnesium chloride present preferably as the dihydrate, or tetrahydrate, or combination thereof, may be readily separated and recovered in a very high state of purity. Magnesium chloride hexahydrate, though recoverable by the process yields a less pure magnesium chloride than when recovering either the di- or tetrahydrate.

Solid mixtures particularly suitable for use in the present invention are those primarily composed of said hydrate in an amount of at least about 50 percent and which contain essentially only sodium and potassium chloride as impurities from which the magnesium chloride is desirable to be separated. Small amounts of other alkali metal salts may also be present such as, for example, lithium chloride. Mixtures such as these may be obtained as the product derived from processing carnallite liquids or solids. In the event there is an excess of calcium salts such as calcium chloride present in the salt mixtures they can be removed prior to the organic extraction using conventional techniques such as by the addition of sodium or potassium carbonate, or sulfates, and the like, to precipitate the undesirable calcium values as insoluble salts.

It should be noted that only small amounts of water can be tolerated in carrying out the present process, since any water tends to dissolve a portion of the other salts thus increasing contamination of the magnesium chloride product. Reference to water herein refers to free water and water in combination such as water of hydration.

The high purity magnesium chloride product recovered by means of the process of the present invention has many uses, among them being its utilization as a catalyst in chemical reactions, as feed material for the production of magnesium metal using electrolytic cells, and in analytical work in general. In addition, the process is applicable for use in batch, cyclic batch, or in continuous type extraction or leaching operations employing either concurrent or countercurrent flow techniques. In leaching, for example, while in contact with the mixture the solvent extracts or leaches out the magnesium hydrate and is then directed to an evaporator device, whereupon, it is heated to draw off the solvent, which is recycled back to the leacher for re-use leaving a product of high purity magnesium chloride hydrate. The solid residues remaining after extracting the magnesium chloride from the feed mixture, which contains a small amount of unrecovered magnesium chloride and in most cases primarily sodium and potassium chloride, may be reprocessed as by conventional recrystallization methods to recover said small amount of magnesium chloride.

The process of the present invention then provides a means for separating magnesium chloride from solid mixtures primarily composed of said magnesium chloride together with lesser amounts of both potassium and sodium chloride, thereby to obtain and recover magnesium chloride hydrates from said mixtures in a very high state of purity. As aforesaid, the process is to be differentiated from one wherein magnesium chloride is attempted to be recovered from various mediums composed primarily of sodium and potassium chloride together with lesser amounts of magnesium chloride.

It should further be noted that the present process is for use in separating, recovering and purifying magnesium chloride hydrates. That is, the water of hydration of the magnesium chloride is not lost during processing to yield anhydrous magnesium chloride, but rather is retained by said chloride throughout the process including the leaching step.

The following examples serve to more fully illustrate the operation of the present invention but it is not intended to be limited thereto.

*Example 1*

To illustrate the separation and recovery process of the present invention for obtaining high purity magnesium chloride by leaching from a solid dry starting material already concentrated with magnesium chloride dihydrate, 200 grams of such material having a composition by weight of 78.1 percent magnesium chloride, 0.13 percent potassium chloride, and 1.01 percent sodium chloride, and 1.3 percent of magnesium oxide, the balance being essentially water of hydration, was contacted in a vessel of adequate capacity with 500 cc. of methyl alcohol (solvent-to-solid ratio of about 1.98) at a temperature of 30° C. and stirred for about 90 minutes. Thereupon, the magnesium chloride content of the solid starting material was extracted and concentrated in the liquid methanol, resulting in a slurry composed of a liquid methanol phase containing dissolved $MgCl_2$ and a solid phase of an undissolved residue primarily of KCl and NaCl and some undissolved $MgCl_2$. This slurry was then filtered to separate said liquid phase (methanol) from the solid phase. The liquid phase weighing 519 grams was analyzed and found to have about 25.3 percent magnesium chloride, about 0.0101 percent potassium chloride and about 0.0074 percent sodium chloride, the balance being methanol and water. 435 grams of solution constituting the liquid phase were evaporated in a suitable vessel to dryness at room temperature followed by drying in an oven at 120° C. for 6 hours. The dried material weighed 162 grams and had the following analysis:

| | Percent |
|---|---|
| Magnesium chloride | 66.3 |
| Water | 33.3 |
| Methanol | 1.1 |
| Potassium chloride | 0.04 |
| Sodium chloride | 0.02 |
| Calcium chloride | 0.51 |
| Magnesium oxide | 0.37 |
| Total | 101.64 |

This represented a recovery yield of about 86 percent of magnesium chloride dihydrate. The total weight analysis shown as being slightly in excess of 100 percent is attributed to the limitations of the analytical methods employed.

The methanol content as indicated above may be substantially reduced by further drying.

*Example 2*

Similarly as in Example 1 above, 23 grams of impure $MgCl_2 \cdot 2H_2O$ based salt mixture, having the same composition as in Example 1 was contacted with 600 cc. of methanol (solvent-to-solid ratio by weight of 2.04) and processed at 20° C. yielding ultimately after filtration on a solvent free basis a product containing 99.87 percent magnesium chloride, 0.05 percent potassium chloride, and 0.080 percent sodium chloride.

*Example 3*

Similarly as in Example 1 above about 200 grams of a solid mixture having the same composition as therein given was contacted with 600 cc. of methanol (solvent-to-solid weight ratio of 2.38) at the same temperature also as in Example 1. Upon filtering, the liquid phase was analyzed and found to contain on a dry weight basis 99.91 percent magnesium chloride, 0.046 percent potassium chloride, and 0.004 percent sodium chloride.

Various modifications can be made in the process of the present invention without departing from the spirit or scope thereof and it is understood that I limit myself only as defined in the appended claims.

I claim:

1. A method of separating and recovering magnesium chloride hydrate as a high purity product from a solid acidified mixture consisting essentially of said hydrates together with small amounts of primarily sodium and potassium chlorides comprising the steps of: contacting the mixture, at a temperature with the range of about 0° to about 50° C., with an alcohol as a solvent selected from the group consisting of methanol and ethanol in a solvent-to-solid weight ratio sufficient to preferentially extract magnesium chloride therefrom, thereby concentrating said magnesium chloride in the selected alcohol, followed by separating it therefrom, thus obtaining a high purity magnesium chloride hydrate product.

2. The process of claim 1 wherein the alcohol used is methanol.

3. The process of claim 2 wherein the solvent-to-solid ratio is within the range of from about 1.8 to about 2.4.

4. The process of claim 1 wherein the temperature at which the separation and recovering is carried is within the range of from about 20° to about 35° C.

5. The process of claim 1 wherein the acidified mixture has an apparent pH of at least about 5.

6. The process of claim 1 wherein the magnesium chloride hydrates in the mixture sought to be purified comprises the dihydrate and tetrahydrate of magnesium chloride.

7. The method of separating and recovering high purity magnesium chloride dihydrate from a mixture having the composition by weight comprising 78.1 percent magnesium chloride dihydrate, 0.13 percent potassium chloride, 1.3 percent magnesium oxide, and 1.01 percent of sodium chloride, the balance being water and minor amounts of other alkali metal and alkaline earth salts, comprising contacting the mixture in a vessel with methyl alcohol in a solvent-to-solid ratio of about 1.98, at a temperature of about 30° C., with stirring for about 90 minutes, thereby to concentrate the dihydrate in the liquid alcohol phase leaving a solid residue primarily of KCl and NaCl, separating the alcohol from the residue, and recovering the purified dihydrate by removing the alcohol, thereby separating and recovering it.

References Cited

UNITED STATES PATENTS

| 2,024,242 | 12/1935 | Moschel | 23—91 X |
| 2,381,994 | 10/1945 | Belchez | 23—91 |
| 2,381,995 | 10/1945 | Belchez | 23—91 X |
| 2,479,001 | 10/1949 | Burke | 23—304 X |
| 3,105,740 | 10/1963 | George. | |

NORMAN YUDKOFF, *Primary Examiner.*